US010002379B2

(12) United States Patent
Goto et al.

(10) Patent No.: US 10,002,379 B2
(45) Date of Patent: Jun. 19, 2018

(54) POWER TOOL AND SALES SYSTEM THEREFOR

(71) Applicant: MAKITA CORPORATION, Anjo-Shi (JP)

(72) Inventors: Masahiko Goto, Anjo (JP); Tomonori Araki, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 569 days.

(21) Appl. No.: 14/638,427

(22) Filed: Mar. 4, 2015

(65) Prior Publication Data

US 2015/0283694 A1 Oct. 8, 2015

(30) Foreign Application Priority Data

Apr. 8, 2014 (JP) .................................. 2014079586

(51) Int. Cl.
*G06Q 30/06* (2012.01)
*B25H 3/00* (2006.01)
*H01M 2/10* (2006.01)

(52) U.S. Cl.
CPC ......... *G06Q 30/0635* (2013.01); *B25H 3/006* (2013.01); *G06Q 30/0621* (2013.01); *H01M 2/1022* (2013.01); *H01M 2220/30* (2013.01)

(58) Field of Classification Search
CPC .. B25F 5/00; B25H 3/00; B25H 3/006; B25H 3/02; B65D 25/28; B65D 85/28; H02J 7/00; H02J 7/003
USPC .......................... 206/372, 373; 320/107–114
See application file for complete search history.

(56) References Cited

U.S. PATENT DOCUMENTS

| 6,571,949 | B2 * | 6/2003 | Burrus, IV | ............... | B25H 3/02 206/373 |
| 7,290,655 | B1 * | 11/2007 | Wood | ..................... | A45C 13/02 206/373 |
| 7,513,361 | B1 * | 4/2009 | Mills, Jr. | ................ | A45D 44/00 206/373 |
| 8,579,113 | B2 * | 11/2013 | Baumgartner | ......... | B25H 3/006 206/349 |
| 8,646,600 | B2 * | 2/2014 | Amatrudo | .............. | B25H 3/021 206/373 |

(Continued)

FOREIGN PATENT DOCUMENTS

| DE | 102012111321 A1 * | 5/2014 | ............. B25H 3/006 |
| JP | 2011161603 A | 8/2011 | |

(Continued)

OTHER PUBLICATIONS

Office Action from the Japanese Patent Office dated Jan. 23, 2018 in counterpart Japanese application No. 2014-079586, and machine translation thereof.

*Primary Examiner* — Bryon Gehman
(74) *Attorney, Agent, or Firm* — J-Tek Law PLLC; Jeffrey D. Tekanic; Scott T. Wakeman

(57) ABSTRACT

An 18V power tool having one 18V battery pack attachable thereto and a 36V power tool having two 18V battery packs attachable thereto are housed in a tool case and sold as a set or kit. Two or more battery packs and/or a charger may also be included in the set, and sold therewith. A tool case may be used to house and carry the power tools, as well as the battery packs and/or charger, if provided. Sales systems for selling such power tools are also disclosed.

7 Claims, 10 Drawing Sheets

(56) References Cited

U.S. PATENT DOCUMENTS

| | | | |
|---|---|---|---|
| 8,813,866 B2 * | 8/2014 | Suzuki | B25F 5/00 173/2 |
| 2005/0044051 A1 | 2/2005 | Selby et al. | |
| 2008/0035507 A1 | 2/2008 | Collister et al. | |
| 2011/0198103 A1 | 8/2011 | Suzuki | |
| 2014/0327396 A1 | 11/2014 | Rejman et al. | |

FOREIGN PATENT DOCUMENTS

| | | | | |
|---|---|---|---|---|
| JP | 2014012301 A | 1/2014 | | |
| WO | WO 2007051760 A1 * | 5/2007 | | B25H 3/006 |
| WO | WO 2011151110 A2 * | 12/2011 | | B25H 3/006 |
| WO | 2013075944 A1 | 5/2013 | | |
| WO | WO 2014079687 A1 * | 5/2014 | | B25H 3/02 |

* cited by examiner

POWER TOOL AND SALES SYSTEM THEREFOR

CROSS-REFERENCE TO RELATED APPLICATION

The present application claims priority to Japanese patent application serial number 2014-079586 filed on Apr. 8, 2014, the contents of which are incorporated fully herein.

TECHNICAL FIELD

The present invention generally relates to power tools that use, for example, one or more rechargeable battery packs as a power supply and to sales systems and methods of selling therefor.

BACKGROUND ART

In recent years, an increasing number of handheld (portable) power tools, such as screwdrivers, cutting tools, etc., have been offered with rechargeable battery packs that are attached as the power supply, thereby making the power tool cordless, instead of with power supply cords. In such rechargeable power tools, the battery pack (power supply) has a nominal output voltage that is compatible with the rated voltage of the tool's electric motor (drive source). The battery pack is detachably attached to a tool main body part. Consequently, if the rated voltage of the electric motor is, for example, 36V, then a battery pack having an output voltage of 36V is attached as the power supply. In addition to battery packs having a rated voltage of 36V, battery packs having various other voltages, such as 18V, 14.4V, and 7.2V, have been offered. These battery packs comprise, for example, lithium ion batteries, and a plurality of battery cells is housed in a case; thereby, the battery pack can be reused by detaching it from the tool main body and then charging it using a separately available charger.

US 2008/0035507 discloses a power tool case for storing battery-operated power tools, wherein the case includes a housing, an electrical connector, and an internal electrical outlet. Japanese Laid-open Patent Publication 2011-161603 (and its family member US 2011/0198103) discloses electric power tools powered by a plurality of battery packs that are connected in series.

SUMMARY OF THE INVENTION

Nevertheless, with respect to batteries (battery packs) having various voltages, 36V batteries currently have fewer compatible models, are higher in price, and have a lower prevalence in the market. In contrast, there are numerous compatible models for 18V batteries, and some users own multiple 18V battery packs as spare batteries. Consequently, 18V batteries are currently more widely prevalent in the market than 36V batteries.

The present teachings generally relate to options for increasing the user's convenience when choosing between a power tool designed to operate at 18V and a power tool designed to operate at 36V, while reducing the user's battery costs by providing power tool kits (Combo Kits), for example, that include a 36V power tool powered by two 18V batteries (battery packs) attached as the power supply. In addition or in the alternative, sales systems and sales techniques for the power tool manufacturer, which take the convenience of users into consideration, have also been developed and disclosed herein.

In a first aspect of the present teachings, a power tool set (kit) is disclosed, wherein a first power tool having one battery-mount part for attaching a battery pack as a power supply and a second power tool having two of the battery-mount parts are combined and sold as a set (kit). According to the first aspect, it is possible to purchase a combination (kit) of, for example, a first power tool designed to operate at (having a rating of) 18V and to which one battery pack (18V battery) having a rated voltage of 18V can be attached and a second power tool designed to operate at 36V and to which two battery packs having a rated voltage of 18V can be attached. Consequently, a user (customer) can use both the first power tool and the higher output second power tool by possessing at least two of the separate 18V batteries. Thus, by possessing a plurality of the 18V batteries, the user can appropriately choose between the first power tool and the second power tool in accordance with the nature of the work (power tool operation) to be performed and thereby work efficiency can be increased.

In addition, by making use of 18V batteries, which the user may already possess as spare batteries, the user can use the second power tool designed to operate at 36V without providing (purchasing or otherwise obtaining) a dedicated 36V battery. Therefore, the user can use a power tool capable of a higher output (torque) while reducing battery costs, whereby the manageability (cost-effectiveness) of the high output (36V) power tool can be increased.

In a second aspect of the present teachings, the power tool set (kit) further comprises two of the battery packs designed to be attached to and power the first and second power tools. According to this second aspect, a user (customer) who does not already possess such battery packs also can simultaneously obtain (purchase) two of the battery packs together with the first and second power tools. Therefore, the convenience of the user can be greatly increased in that the first power tool and the second power tool can be purchased together with the necessary battery packs and then promptly used.

In a third aspect of the present teachings, the power tool set (kit) further comprises a charger that is capable of simultaneously charging two of the battery packs, i.e. a charger having two charging cradles. According to this third aspect, a user who does not already possess a charger also can conveniently use the first power tool and the second power tool by simultaneously charging the two battery packs.

In a fourth aspect of the present teachings, a power tool set (kit) comprises a first power tool comprising one battery-mount part for attaching one battery pack as a power supply; and a second power tool comprising two of the (e.g., same) battery-mount parts; wherein the first power tool and the second power tool are housed in one (portable or hand-carryable) tool case. According to this fourth aspect, for example, a user who already possesses two of the battery packs having a rated voltage of 18V can obtain, as a bundle (combo or kit), the first power tool designed to operate at 18V and the second power tool designed to operate at 36V in a tool case designed therefore and, by immediately using them in combination, can effectively utilize the 18V batteries already in his or her possession, thereby increasing work efficiency. In addition, the first power tool and the second power tool can be housed and carried in the one (portable) tool case, and therefore various types of work (power tool operations) can be rapidly handled, which demonstrates the increased convenience of such a power tool set.

In a fifth aspect of the present teachings, the (portable) tool case comprises a portable handle part and is configured such that, when the handle part is grasped and carried, the first power tool and the second power tool are each housed in the tool case with an orientation such that the battery packs of the first power tool and the second power tool are positioned on the handle-part side. According to this fifth aspect, if the handle part is set so that it is the nearest side to the user and the tool case is set on a surface with an orientation such that the tool case is placed on its side on a workbench or another horizontal surface, then the first power tools and the second power tools are positioned with an orientation such that the battery packs are each positioned on the nearest side to the user. Consequently the user can, without changing posture/position relative to the tool case, remove the first power tool or the second power tool from the tool case without the user having to assume an uncomfortable posture/position, having to change the orientation of the tool case, etc., thereby enhancing the handling characteristics (convenience of use) of the power tool sets.

In a sixth aspect of the present teachings, the (portable) tool case comprises a portable handle part on an upper surface of the tool case and is configured such that the first and second power tools are housed in the tool case with an orientation such that the battery packs of the first and second power tools are positioned on the side of the tool case that is the bottommost part in this orientation. According to this sixth aspect, if the user places the tool case, e.g., on a workbench with the tool case in the carrying orientation as is, then the first power tool and the second power tool will each be in an upright orientation, and therefore the user can remove the first power tool and the second power tool from the tool case in the orientation in which the tools are normally used, which can also enhance the handling characteristics (convenience of use) of the power tool sets.

In a seventh aspect of the present teachings, a rechargeable soft-impact (Quick-Shift Mode™) driver equipped with a hydraulic striking mechanism (oil-impact or oil-impulse mechanism) serving as the first power tool is combined with a rechargeable portable circular saw serving as the second power tool and they are sold together as a set (Combo Kit). A soft-impact or Quick-Shift Mode™ impact driver, available from the Assignee (Makita Corporation) of the present application, has an automatic electronic controller that downshifts and reduces rotation and impact speed prior to driving a screw into place, and is designed to minimize screw thread stripping, screw breakage and damage to the workpiece. According to this seventh aspect, the comparatively high-value rechargeable soft-impact driver can be purchased as a package deal with the rechargeable portable circular saw serving as the second power tool in order to provide a high value Combo Kit for the user.

In an eighth aspect of the present teachings, a sales system for a power tool set is disclosed, wherein the power tool set is moved and data are transmitted and received among: a sales company (e.g., a retail store, a wholesaler, an online store, etc.), which accepts an order of a customer and inputs data into a PC (personal computer) or other computing device; a head office, which uses a PC or other computing device to batch manage customer order data inputted by the sales company; a manufacturing plant, which, based on an instruction of the head office, manufactures power tools of a plurality of types with respect to the number of battery packs attached, and combines these to manufacture a power tool set for selling as a set; and a transport company, which transports the power tool set according to the customer order from the manufacturing plant to the sales company.

According to the eighth aspect, the user places an order with the sales company for a combination (Combo Kit) of power tools of a plurality of types with respect to the number of battery packs that can be attached to each power tool. The data concerning the user's order details are input into a terminal PC (or other computing device) at the sales company and batch managed by the host PC (or other computing device) at the head office. Based on the order details, the data of which is managed by the head office, the head office issues an instruction to the terminal PC of the manufacturing plant. At the manufacturing plant, in accordance with the order details verified by the terminal PC, the power tools of a plurality of types with respect to the number of battery packs attached are manufactured or selected from inventory, and preparations for shipping are made. When the shipping preparations are complete, the power tool sets (kit) for being sold as a set are shipped by the transport company to the sales company. At the sales company, the received power tool sets (kit) for being sold as sets are delivered to the users. At the sales company, information concerning the completion of the deliveries is input into the terminal PC (or other computing device) and batch managed by the host PC (or other computing device) at the head office. In addition, the shipment at the manufacturing plant, the transport status at the transport company, and the receipt at the store are also batch managed by the host PC (or other computing device) at the head office.

In a ninth aspect of the present teachings, a method of selling a power tool is disclosed, wherein at a sales company (again, e.g., a retail store, a wholesaler, an online store, etc.), in accordance with an order of a customer, power tools of a plurality of types with respect to the number of battery packs attached are combined from inventory and sold as a set; and the sales data are batch managed at a head office. According to this ninth aspect, if it is possible to fill the user's order from the inventory of the sales company, then the power tools of a plurality of types with respect to the number of battery packs attached can be combined and sold as a set on the spot to the user. Data concerning the fact that the sale of the set was filled from the store's inventory is input into the terminal PC (or other computing device) at the sales company and is batch managed by the host PC (or other computing device) at the head office. In this case, the manufacturing plant and the transport company can be omitted from the sales route in the eighth aspect, and thereby the user's order can be filled more rapidly.

In a tenth aspect of the present teachings, at a sales company, accepted customer order data is transferred (transmitted) to a manufacturing plant; and power tools of a plurality of types with respect to the number of battery packs attached are manufactured at the manufacturing plant based on the order data. A power tool set that combines multiple types of the power tools is shipped by parcel delivery (delivered) directly from the manufacturing plant to the customer. According to this tenth aspect, if the sales company does not have in its inventory the desired power tool set, or individual power tools, ordered by the customer, then the sales company issues a manufacturing instruction directly to the manufacturing company. In this case, at the sales company, data concerning the order details of the customer are input into the terminal PC (or other computing device) and transferred to both the host PC (or other computing device) of the head office and the terminal PC (or other computing device) of the manufacturing plant. The transferred order data are verified by the terminal PC (or other computing device) at the manufacturing plant and, based thereon, the multiple types of power tools are manufactured at the manufacturing plant. The power tool set, which is the combination of the manufactured multiple types of power tools, is delivered directly to the customer by the transport company (a parcel-delivery service provider). Thus, by virtue of the sales company directly issuing a manufacturing instruction to the manufacturing plant, the delivery to the customer can be made rapidly without transiting the head office. In this case as well, the data, such as the customer order data at the sales company, the manufacture instruction to the manufacturing plant, the shipping data at the manufacturing plant, and the parcel-delivery status or the delivery status at the transport company, can be batch managed at the host PC (or other computing device) of the head office. As used in any aspect or embodiment disclosed in the present specification, the term "head office" does not require the processing to actually be performed at the head office or headquarters of the power tool manufacturer. Instead, the processing may be performed at one or more other locations of the power tool manufacturer, or a location (e.g., server) controlled by the power tool manufacturer, or even outsourced to a third party who acts under the control of the power tool manufacturer.

In an eleventh aspect of the present teachings, a sales system is disclosed, wherein a first power tool having one battery-mount part for attaching a battery pack as a power supply and a second power tool that having two of the battery-mount parts are combined and sold as a set (Combo Kit), wherein particular combinations of the first power tool and the second power tool are predetermined or pre-selected (pre-patterned), e.g., at the power tool manufacturer or at the sales company that sells the power tools. A customer places an order for a power tool set by selecting from the predetermined combinations. According to this eleventh aspect, the customer can order a desired power tool set by selecting from among the predetermined combinations (predetermined Combo Kits) of power tool sets preset, e.g., at the manufacturer of the power tools or at the sales company. The preset combinations of the power tool sets can be determined (set) taking into consideration the nature of the work (i.e. to thereby increase work efficiency), the frequency with which the user uses the respective tools, the convenience of the user, etc.

DETAILED DESCRIPTION

Figure 1:
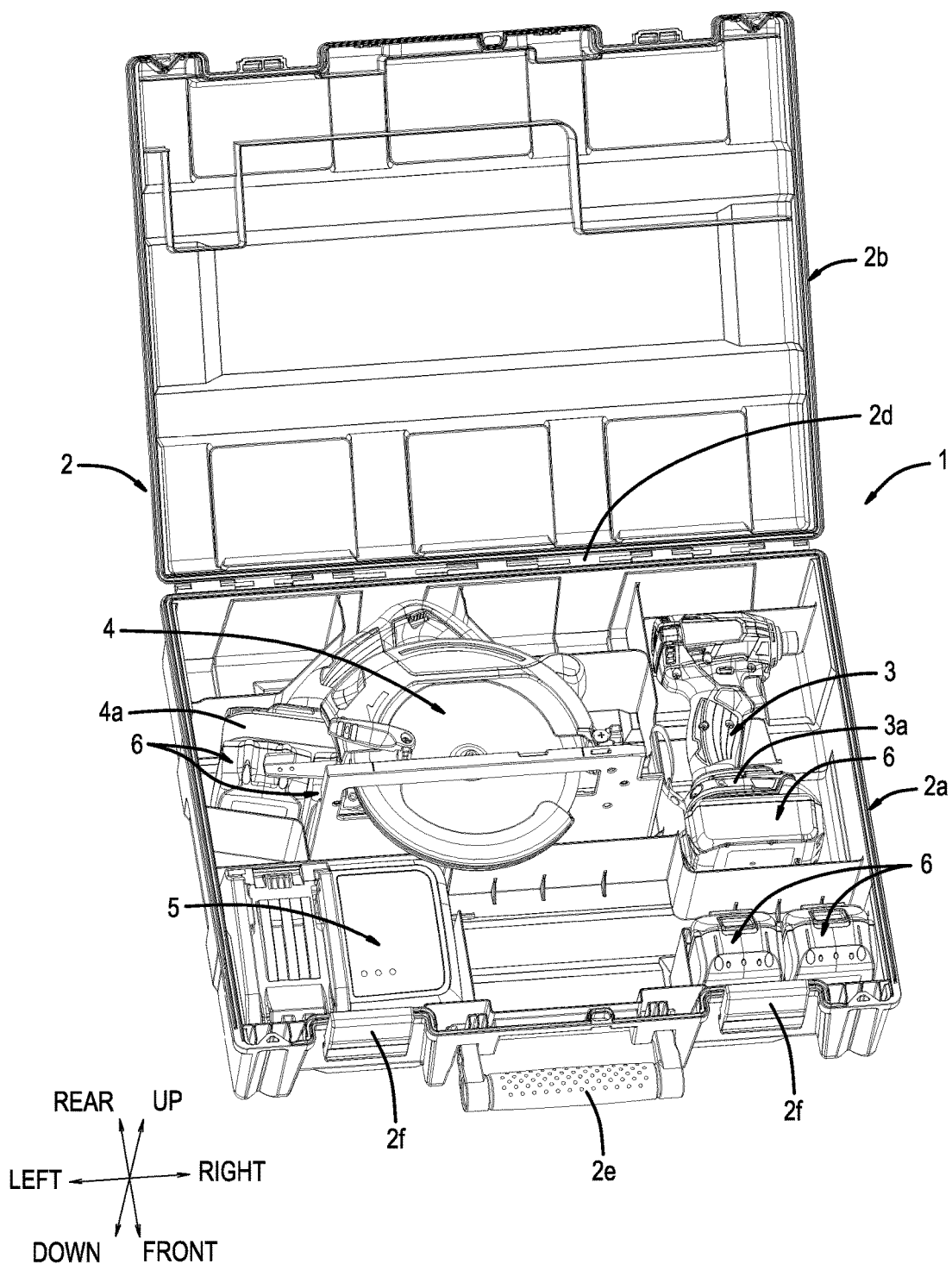
FIG. 1 is an overall oblique view of a power tool set (Combo Kit) according to a first embodiment of the present teachings, which shows a screwdriver (an impact driver) designed to operate at 18V and a portable circular saw designed to operate at 36V housed together in a (portable) tool case. In addition to the two power tools, one charger and two spare (extra) 18V batteries are also housed in the (portable) tool case.
Figure 2:
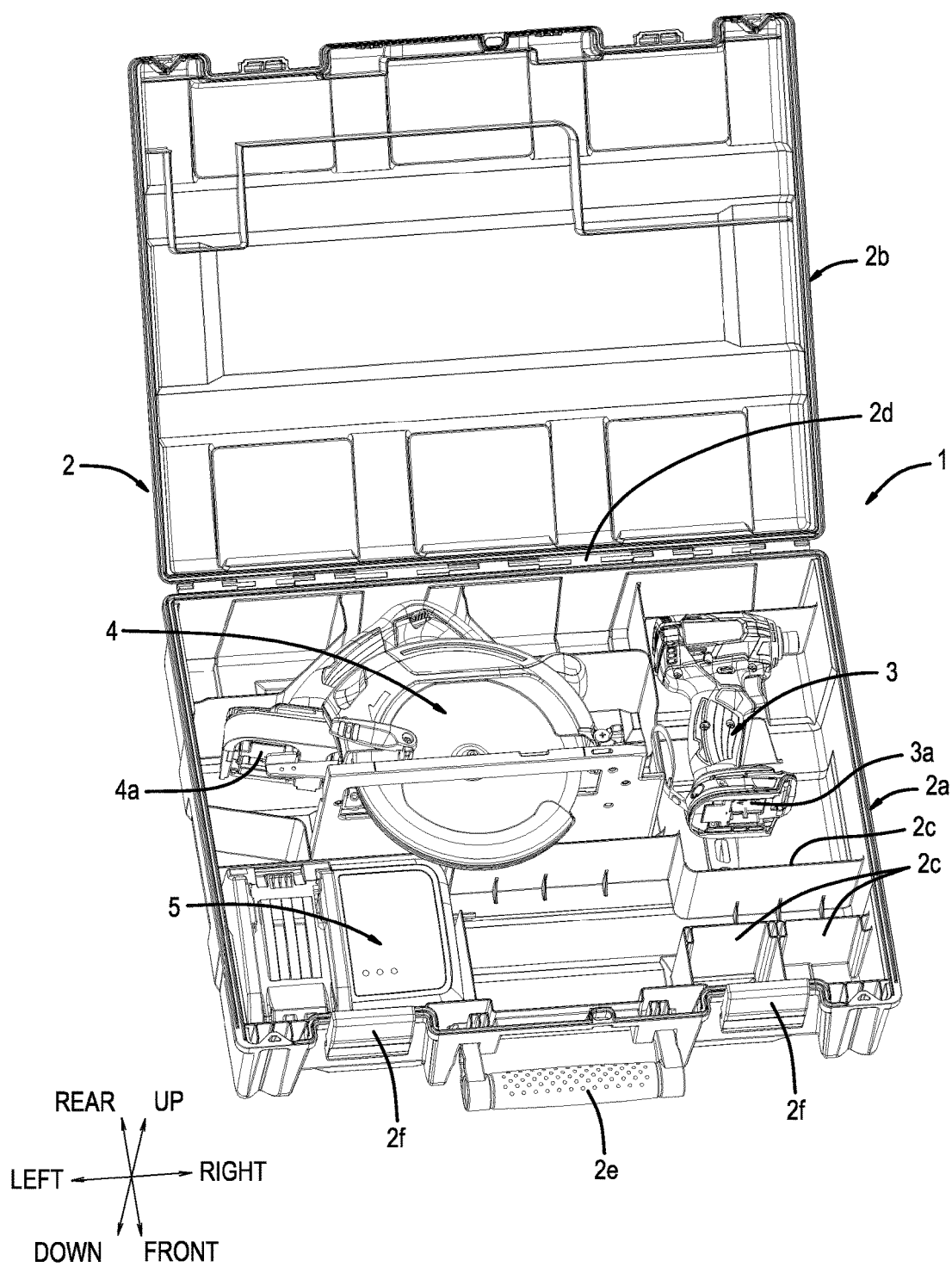
FIG. 2 is an overall oblique view of the power tool set according to the first embodiment, which shows the battery packs detached (removed) from both of the power tools and the two spare batteries removed (omitted).

A first representative, non-limiting embodiment of the present teachings will be explained in the following with reference to FIGS. 1-3. As shown in FIG. 1, in a power tool set (kit) 1 according to the first embodiment, a tool case 2 houses one first power tool 3, one second power tool 4, one charger 5, and two extra battery packs 6 serving as spare batteries, and these are bundled and sold together as a set (Combo Kit) to a customer. An additional battery pack 6 is attached as a power supply to a battery-mount part 3a of the first power tool 3. Two additional battery packs 6 are attached as a power supply to the two battery-mount parts 4a of the second power tool 4. Series-connected lithium ion batteries having a total rated voltage of 18V are used in the battery packs 6, for which there are a total of three connected to the first and second power tools 2, 3. In addition, as shown in FIG. 2, the power tool set 1 can also be sold as a set without the battery packs 6 attached to the first and second power tools 3, 4, and/or without the two additional battery packs 6 (which served as the spare batteries in FIG. 1).

The tool case 2 or the charger 5, as needed, may be sold at the same time (together therewith) but do not have to be sold at the same time (i.e. in the same set or kit). That is, the first and second power tools 3, 4 may be sold alone without the tool case 2. In addition, each of the battery packs 6 is a rechargeable battery, which is attached and detached by sliding, has a plurality of built-in battery cells, and has sliding rails and a latching hook in accord with the sliding-type attachment and detachment. Furthermore, connection terminals of each of the battery packs 6 are configured such that they connect by sliding. Moreover, each of the first and second power tools 3, 4 is configured such that it can be housed in the tool case 2 both with the battery packs 6 attached thereto, as well with the battery packs 6, 6 removed.

Figure 3:
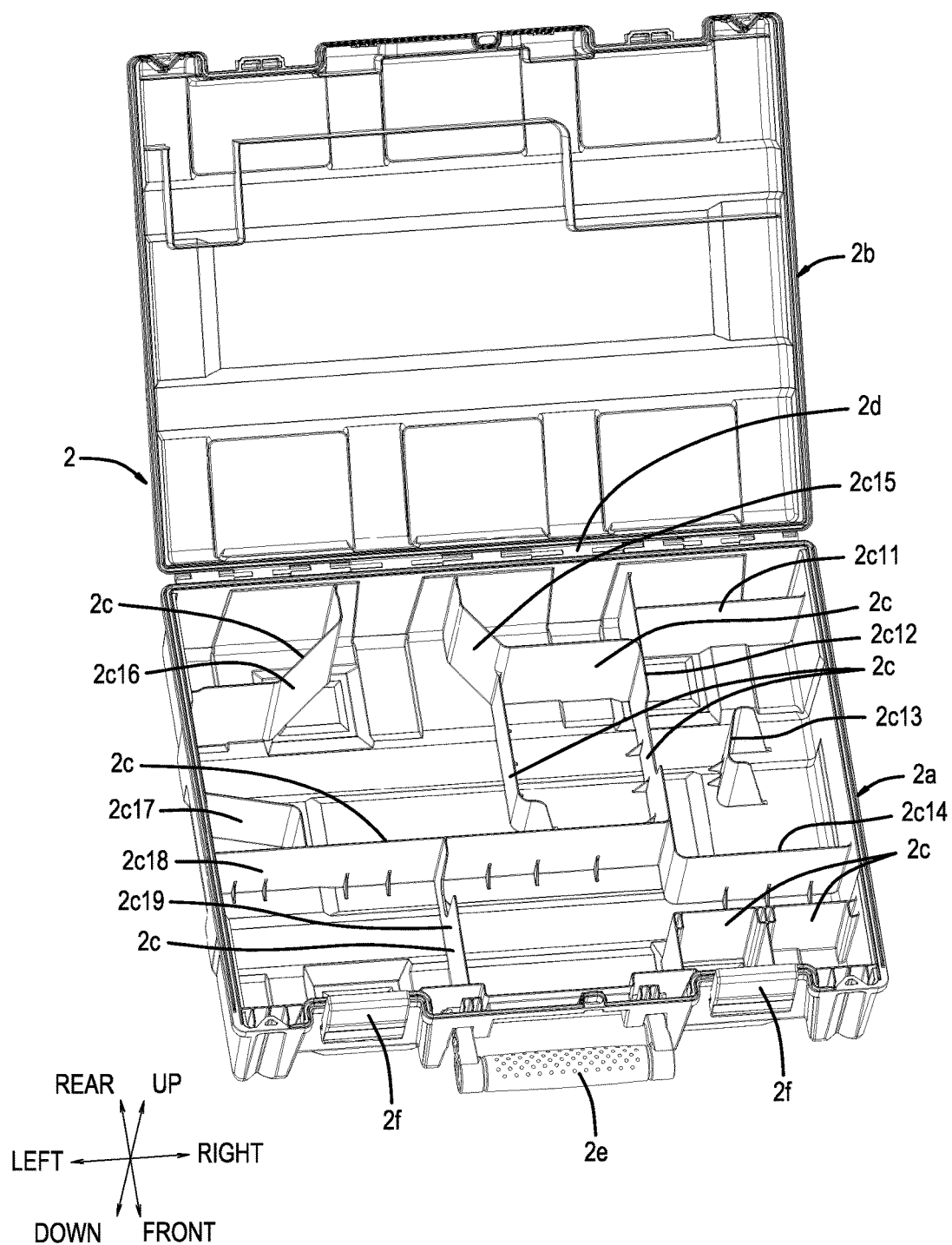
FIG. 3 is an oblique view of a single tool case for the power tool set according to the first embodiment.

In FIG. 3, the tool case 2 is shown by itself (i.e. without the tools and accessories). The tool case 2 is preferably a plastic hard case formed by molding a synthetic resin. The tool case 2 comprises a case main-body part 2a, which is preferably configured to house the two power tools 3, 4, the charger 5, and the two battery packs 6 serving as the spare batteries. A cover part (lid) 2b is pivotably connected to the case main-body part 2a. The case main-body part 2a is a comparatively shallow-bottomed casing body having a generally rectangular shape whose upper part is open, and an internal space thereof is partitioned by partition walls 2c for preventing the rattling of articles (items, e.g., tools and/or accessories) housed (contained) therein. Furthermore, wall 2c11 restricts movement, upward in the drawing, of a motor housing part of the first power tool 3. In addition, wall 2c12 restricts movement, leftward in the drawing, of the motor housing part, the battery pack 6, and the like of the first power tool 3. Wall 2c13 restricts movement, rightward in the drawing, of the motor housing part, the battery pack 6, and the like of the first power tool 3. Wall 2c14 restricts movement, downward in the drawing, of the battery pack 6 of the first power tool 3.

Wall 2c15 restricts movement, upward in the drawing and rightward in the drawing, of a handle part of the second power tool 4. Wall 2c16 restricts movement, upward in the drawing and leftward in the drawing, of the handle part of the second power tool 4. Wall 2c17 restricts movement, leftward in the drawing, of a base part of the second power tool 4. Wall 2c18 restricts movement, downward in the drawing, of the base part of the second power tool 4. Wall 2c19 restricts movement, rightward in the drawing, of the charger 5. A handle part 2e, which a user grasps when carrying the case main-body part 2a (tool case 2), is provided on (preferably pivotably attached to) a front part of the case main-body part 2a. Locks 2f for locking the closed state of the cover part 2b are respectively provided leftward and rightward of the handle part 2e.

The cover part 2b is coupled via a hinge part 2d to a rear part of the case main-body part 2a such that the cover part 2b can be pivoted up and down when the case main-body part 2 is lying on a surface in a horizontal orientation. After pivoting the cover part 2b downward to close the case main-body part 2a and then locking the closed state using the locks 2f, the user can grasp the handle part 2e and carry the power tool set 1. The first and second power tools 3, 4 are housed with an orientation wherein their respective battery packs 6 face the handle part 2e side (the side nearest to the user's hand when carrying the power tool set 1). In addition, the charger 5 and the battery packs 6 are disposed within the case main-body part 2a closest to the side of the handle part 2e.

As shown in FIG. 1, the first power tool 3 is a screwdriver (driver-drill) designed to operate at 18V, and one of the battery packs 6 having a rated voltage of 18V is attached as a power supply to the battery-mount part 3a of the first power tool 3. The second power tool 4 is a portable circular saw designed to operate at 36V, and two of the battery packs 6 having a rated voltage of 18V are attached to the battery-mount part 4a of the second power tool 4 to serve as the power supply. Consequently, these tools are easy to use, for example, during a power tool operation that involves cutting wood and subsequently driving screws therein. The battery packs 6 can be used repeatedly by detaching them from the battery-mount parts 3a, 4a of the power tools 3, 4 and then charging them with the charger 5. The charger 5 uses 110V AC of mains power (commercially-available AC power, e.g., from a wall socket) as the power supply, and one battery pack 6 having a rated voltage of 18V can be attached at a time to the charger 5 for charging. In the alternative, as discussed below, a dual-port charger can be provided that has two charging cradles capable of simultaneously charging two battery packs.

According to the power tool set 1 having the combination as described above, the first power tool 3 designed to operate at 18V and the second power tool 4 designed to operate at 36V can be used by attaching any of the commonly-usable battery packs 6. Therefore, a variety of work can be performed more efficiently by appropriately using the first power tool 3 and the second power tool 4 in accordance with the nature of the work. Moreover, the convenience of the user (customer) is increased by virtue of the first power tool 3 and the second power tool 4, wherein the number(s) of the battery packs 6 that can be attached differ, being housed in the one tool case 2 and sold as a set.

Figure 4:
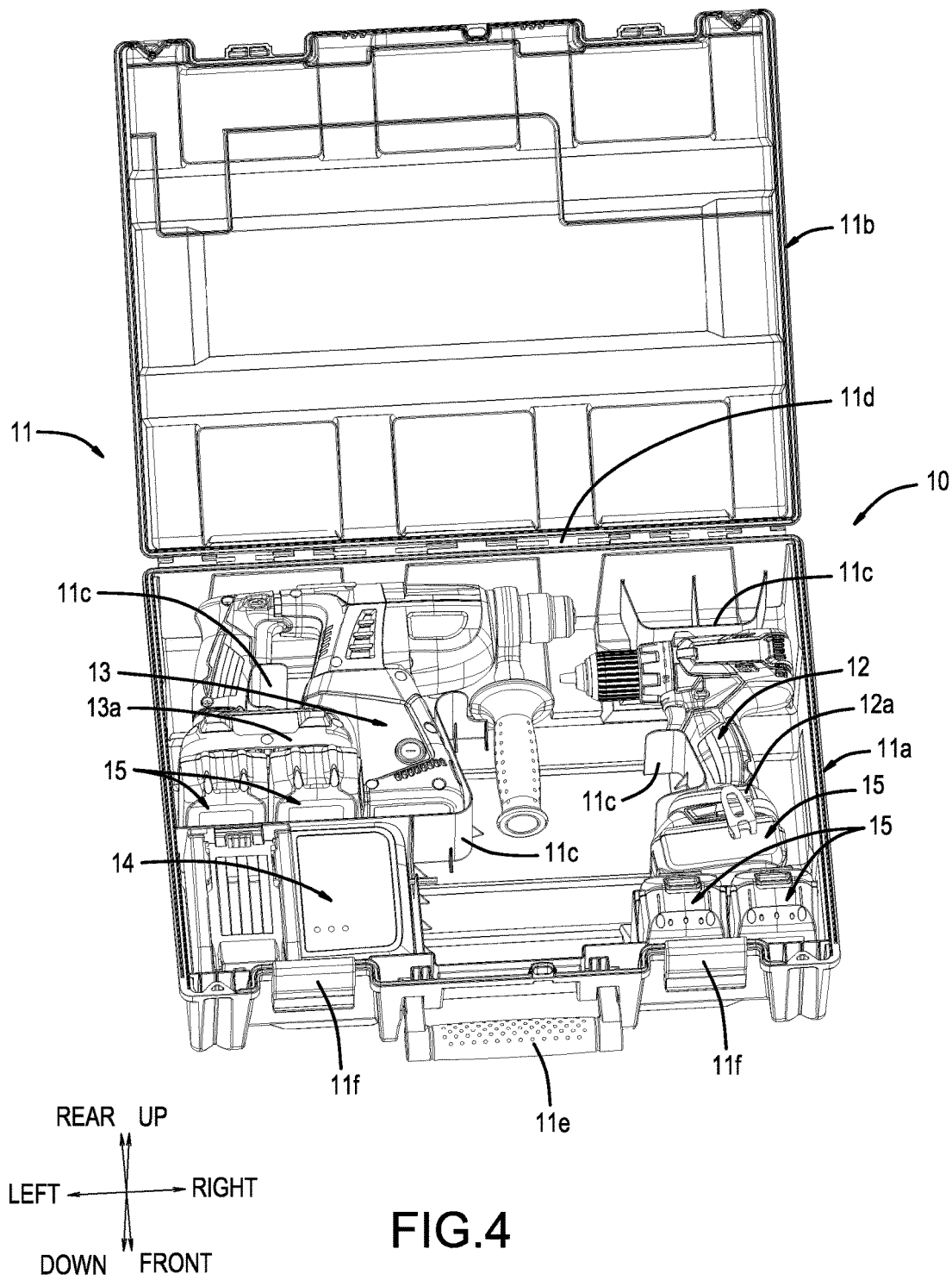
FIG. 4 is an overall oblique view of the power tool set according to a second embodiment of the present teachings, which shows a drill (a drill driver) designed to operate at 18V (first power tool) and a hammer drill designed to operate at 36V (second) power tool housed together in the (portable) tool case.
Figure 5:
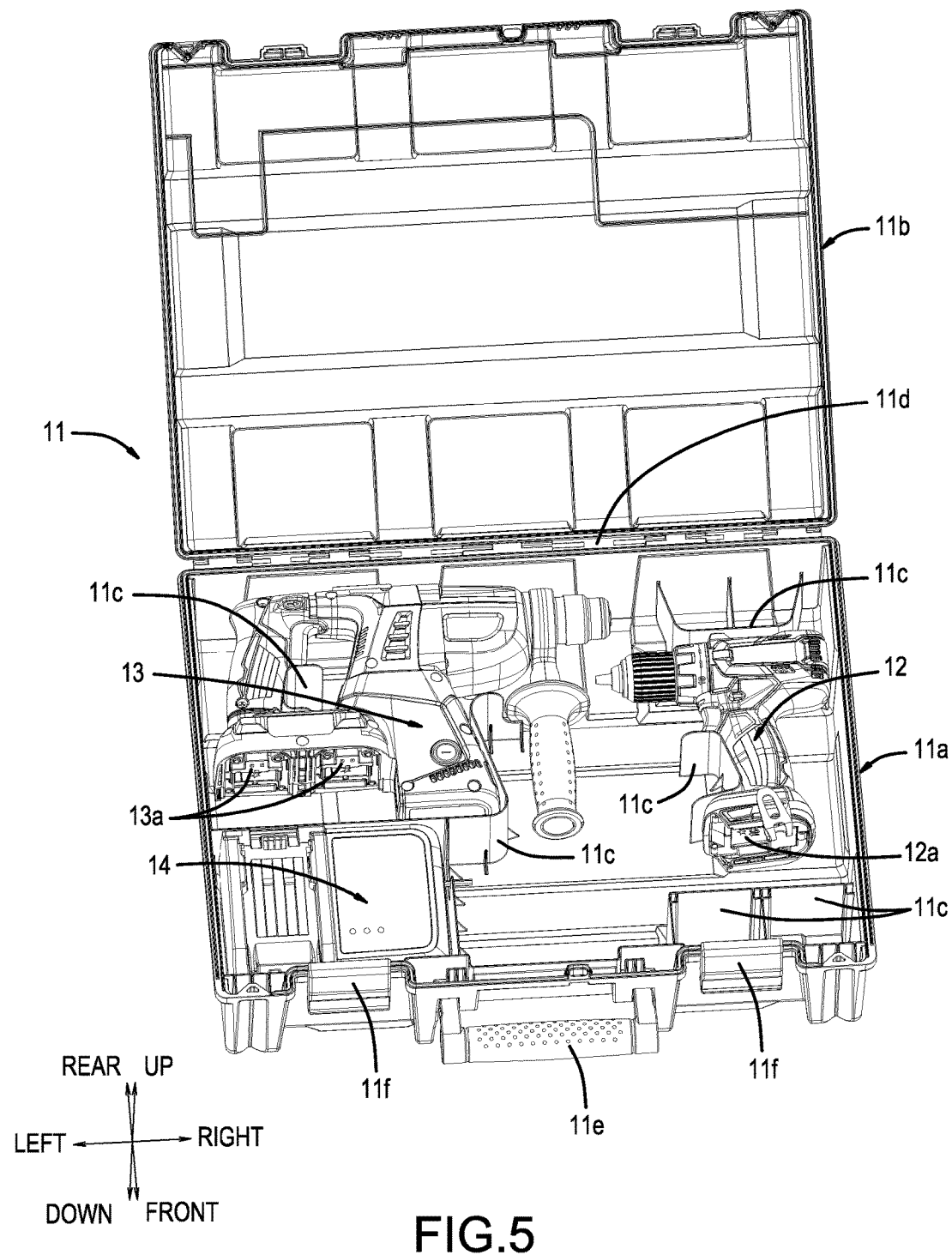
FIG. 5 is an overall oblique view of the power tool set of the second embodiment, which shows the battery packs detached (removed) from both of the power tools and the two spare batteries removed (omitted).
Figure 6:
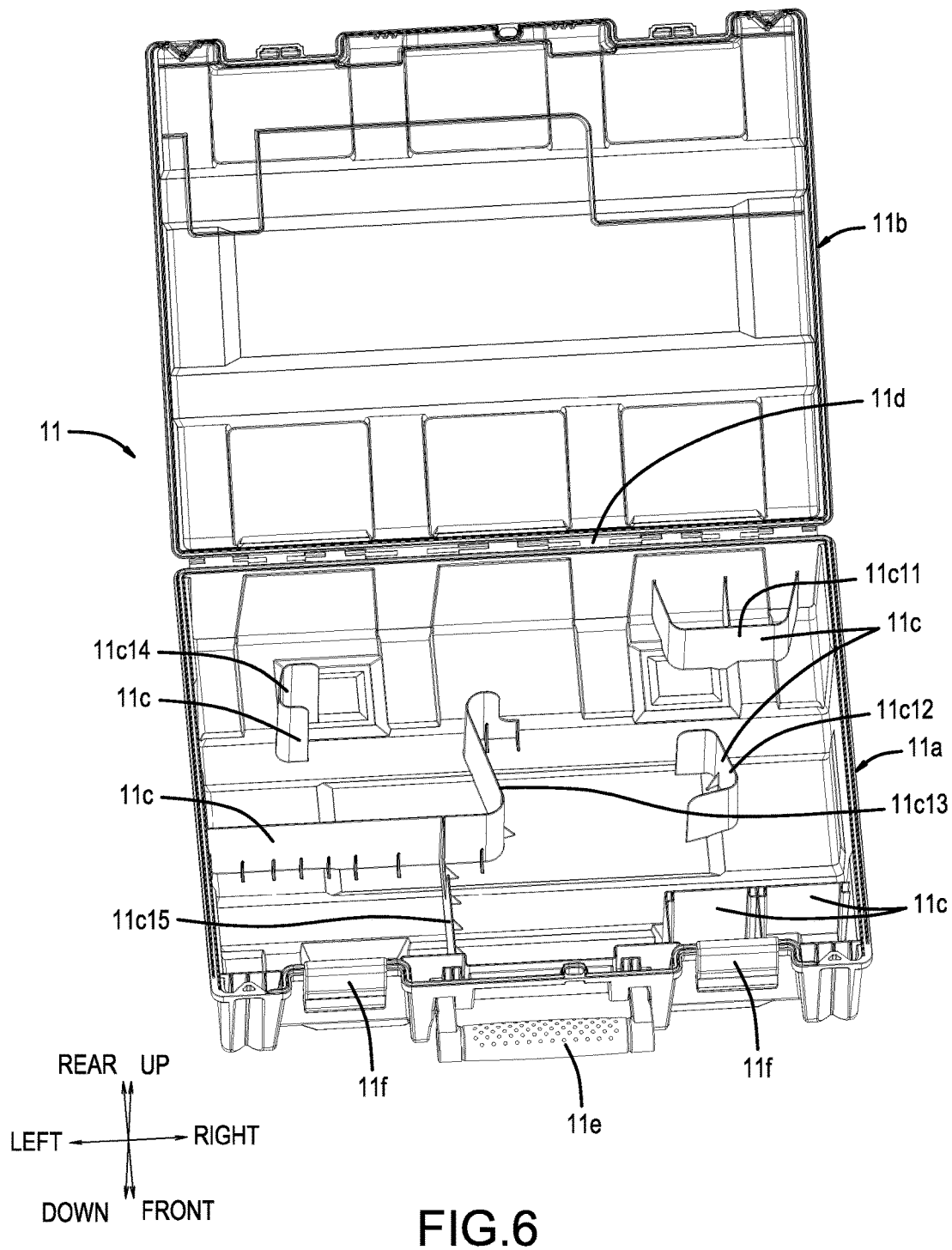
FIG. 6 is an oblique view of a single tool case for the power tool set according to the second embodiment.

FIGS. 4-6 show a power tool set 10 according to a second embodiment. As shown in FIG. 4, in the power tool set 10 according to the second embodiment, one first power tool 12, one second power tool 13, one charger 14, and two battery packs 15 serving as spare batteries are housed in a tool case 11, and these are bundled and sold as a set (Combo Kit) to a customer. An additional battery pack 15 serving as a power supply is attached to a battery-mount part 12a of the first power tool 12. Two additional battery packs 15 serving as a power supply are respectively attached to two battery-mount parts 13a of the second power tool 13. A plurality of series-connected lithium ion batteries having a total rated voltage of 18V is used for each of the battery packs 15, of which there are a total of three that are attached to the first and second power tools 12, 13. In addition, as shown in FIG. 5, the power tool set 10 can also be sold as a set (Combo Kit) with the battery packs 15 detached from the first and second power tools 12, 13 and/or the two battery packs 15 serving as spare batteries omitted. Furthermore, the first and second power tools 12, 13 may also be sold alone without the case.

In FIG. 6, the tool case 11 is shown by itself (empty) for the sake of clarity. As in the first embodiment, the tool case 11 is a plastic hard case formed by molding a synthetic resin. The tool case 11 comprises: a case main-body part 11a, which houses the two power tools 12, 13, the charger 14, and the two battery packs 15, 15 serving as the spare batteries. A cover part (lid) 11b is pivotably attached to the case main-body part 11a. The case main-body part 11a is a comparatively shallow-bottomed casing body having a rectangular shape whose upper part is open, and an internal space thereof is partitioned by partition walls 11c-11c for preventing the rattling (shifting) of articles (tools and/or accessories) housed therein. Furthermore, wall 11c11 restricts movement, upward in the drawing, of a motor housing part of the first power tool 12. In addition, wall 11c12 restricts movement, leftward in the drawing, of the handle part of the first power tool 12. Wall 11c13 restricts movement, rightward in the drawing, of the motor housing part of the first power tool 12. Wall 11c14 also restricts movement, rightward in the drawing, of the handle part of the second power tool 13. Wall 11c15 restricts movement, rightward in the drawing, of the charger 14. A handle part 11e, which a user grasps when carrying the case main-body part 11a, is provided on a front part of the case main-body part 11a. Locks 11f for locking the closed state of the cover part 11b are provided leftward and rightward of the handle part 11e.

The cover part 11b is coupled via a hinge part 11d to a rear part of the case main-body part 11a such that the cover part 11b can be pivoted up and down. By pivoting the cover part 11b downward to close the case main-body part 11a and then locking the closed state using the locks 11f the user can grasp the handle part 11e and carry the power tool set 10. The first and second power tools 12, 13 are housed with an orientation wherein their battery packs 15 face the handle part 11e side (the side nearest to the user's hand when carrying the power tool set 10). In addition, the charger 5 and the battery packs 15 are disposed within the case main-body part 11a on the side closest to the handle part 11e.

As shown in FIG. 4, the first power tool 12 is a power driver-drill for drilling holes and is designed to operate at 18V, wherein one of the battery packs 15 having a rated voltage of 18V is attached as a power supply to the battery-mount part 12a of the first power tool 12. The second power tool 13 is a hammer drill designed to operate at 36V, and two of the battery packs 15, each having a rated voltage of 18V, are attached as the power supply to the battery-mount part 13a of the second power tool 13. The battery packs 15 can be used repeatedly by detaching them from the battery-mount parts 12a, 13a of the power tools 12, 13 and then charging them with the charger 14. The charger 14 uses 110V AC of mains power as the power supply, and one battery pack 15 having a rated voltage of 18V can be attached at a time to the charger 14 for charging, or a dual-port charger can be provided as was mentioned above. Consequently, in one possible use of the first and second power tools 12, 13, for example, when drilling holes in concrete, the tools can be used advantageously.

According to the power tool set 10 of the second embodiment having the combination as described above, the first power tool 12 designed to operate at 18V and the second power tool 13 designed to operate at 36V can be used by attaching the commonly-usable battery packs 15. Therefore, a variety of work can be performed more efficiently by appropriately using of the first power tool 12 and the second power tool 13 in accordance with the nature of the work. Moreover, the convenience of the user (the customer) is increased by virtue of the first power tool 12 and the second power tool 13, wherein the number(s) of the battery packs 15 that can be attached differ, being housed in the one tool case 2 and sold as a set.

In addition, according to the power tool sets 1, 10 according to the first and second embodiments, the first power tools 3, 12 and the second power tools 4, 13 housed in the tool cases 2, 11 are housed with an orientation such that each of the battery packs 6, 15 faces the side closest to the handle parts 2e, 11e. Consequently, as shown in FIGS. 1 and 4, if the handle parts 2e, 11 e are set on the side nearest to the user and the tool cases 2, 11 are set with an orientation such that they are placed on their sides on a workbench or another horizontal surface, then the first power tools 3, 12 and the second power tools 4, 13 are positioned with an orientation such that the battery packs 6, 15 each face the side nearest to the user. Consequently the user can comfortably remove the first power tools 3, 12 or the second power tools 4, 13 from the tool cases 2, 11 without the user having to assume an uncomfortable or awkward posture, having to change the orientation of the tool cases 2, 11, etc., whereby the handling characteristics (convenience of use) of the power tool sets 1, 10 can be enhanced.

Figure 7:
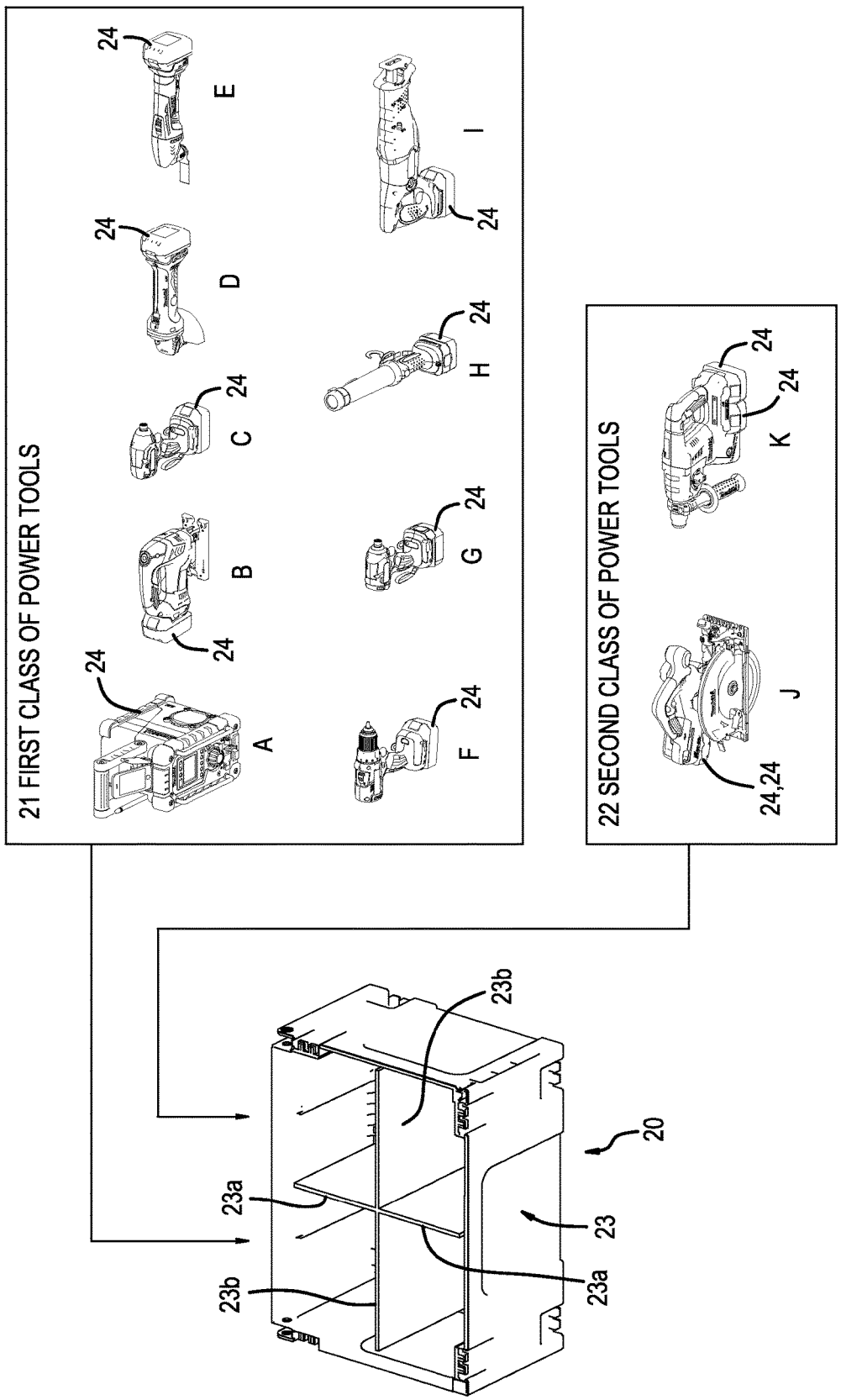
FIG. 7 is an oblique view of a power tool set according to a third embodiment of the present teachings and shows two classes of power tools that may be variously combined and housed in a tool case.
Figure 8:
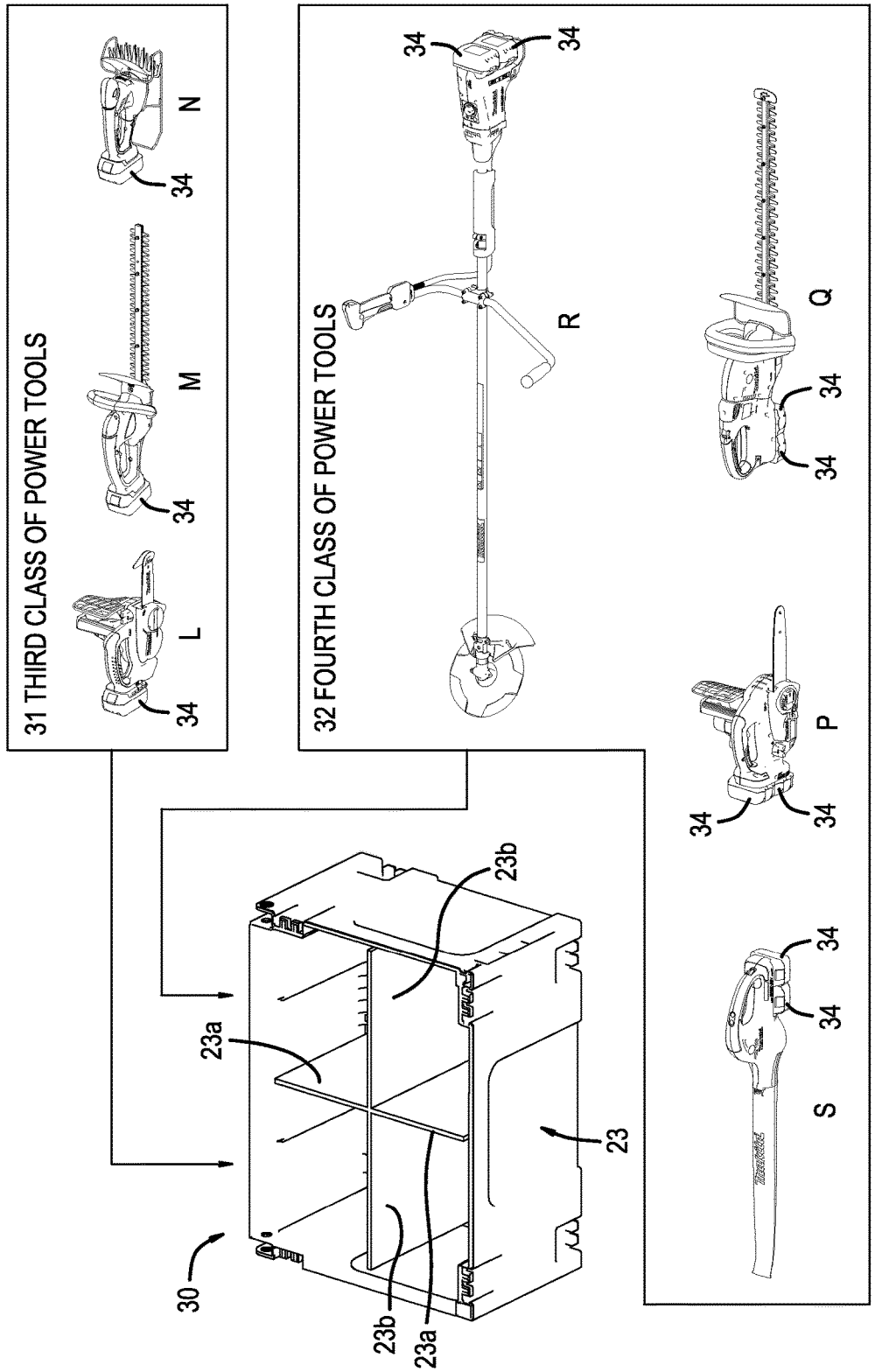
FIG. 8 is an oblique view of a power tool set according to a fourth embodiment of the present teachings and shows two classes of power tools that may be variously combined and housed in a tool case.

Next, FIG. 7 shows a power tool set 20 of a third embodiment, and FIG. 8 shows a power tool set 30 of a fourth embodiment. In the power tool set 20 of the third embodiment, one or a plurality of power tools selected from a first class 21 of power tools and one or two power tools selected from a second class 22 of power tools are combined, housed in a tool case 23, and sold as a set (Combo Kit). The first class 21 of power tools comprises nine types of power tools A-I, to each of which one battery pack 24 having a rated voltage of 18V can be attached as the power supply. The second class 22 of power tools comprises two types of power tools J, K, to each of which two of the battery packs 24 having the same rated voltage of 18V can be attached as a power supply.

The first class 21 of power tools comprises the nine types of power tools A-I. Power tool A is a rechargeable radio for playing music, for example, while working on-site. Power tool B is a rechargeable jigsaw (a cutting machine/tool) that cuts wood and the like. Power tool C is a rechargeable oil-pulse-type soft-impact driver (also called an oil-pulse driver) that drives screws into wood and the like. Power tool D is a rechargeable disc grinder that grinds metal, stone, and the like. Power tool E is a rechargeable multi-tool that cuts, strips, etc., materials such as wood, sealing materials, and the like. Power tool F is a rechargeable power driver-drill that drills holes in concrete, drives screws into wood, etc. Power tool G is a rechargeable impact driver that drives screws into wood and the like. Power tool H is a rechargeable flashlight that provides bright illumination when the site is dark. Power tool I is a rechargeable reciprocating saw (recipro saw) that cuts wood, iron pipe, and the like. A variety of power tool sets 20 may be configured by selecting one or a plurality of power tools from among the nine types of power tools A-I. The second class 22 of power tools comprises the two types of power tools J, K. Power tool J is a rechargeable portable circular saw that cuts wood and the like. Power tool K is a rechargeable hammer drill that drills holes in concrete.

The tool case 23 is a large tool storage case having a comparatively large depth and whose upper part is open, and a plastic hard case is used therefor, as for the tool case 2, 11. The tool case 23 is opened and closed by a cover part (lid), which is pivotably coupled thereto such that it is capable of pivoting up and down. The cover part is not shown in the drawings. The interior of the tool case 23 is partitioned into four storage spaces by longitudinal walls 23a and transverse walls 23b, which intersect one another in the shape of a cross. Each storage space houses one or a plurality of power tools selected from the first class 21 of power tools and one or a plurality of power tools selected from the second class 22 of power tools, and thereby the power tool set 20 is configured (outfitted). There are a plurality of (two or more) spaces in which the power tools are housed, but the number of spaces can be modified as desired.

Because the depth of each of the storage spaces of the tool case 23 according to the third embodiment is sufficiently large (deep), each power tool of the first or second classes 21, 22 of power tools in each storage space is stored with an orientation such that the battery pack 24 abuts the bottom part and is vertically upright. Therefore, the center of gravity of each power tool is positioned on the bottom-part side as much as possible and each power tool can be stored with a stable orientation. For example, power tools A, C, F, G, H of the first class 21 of power tools and power tool K of the second class 22 of power tools can be stored with an upright orientation in the drawing. On the other hand, power tools B, D, E, I of the first class 21 of power tools may be placed in the tool case 23 with a transversely oriented attitude extending transversely in the drawing. Therefore, each power tool in each storage space can be stored with a stable orientation.

In the power tool set 30 of the fourth embodiment, one or a plurality of power tools selected from a third class 31 of power tools, which comprises a combination of so-called outdoor power equipment (gardening) tools, and one or a plurality of power tools selected from a fourth class 32 of power tools are combined, housed in the tool case 23, and sold as a set (Combo Kit). The third class 31 of power tools comprises three types of power tools L-N, to each of which one battery pack 34 having a rated voltage of 18V can be attached as the power supply. Power tool L is a rechargeable chain saw that cuts wood and the like. Power tool M is a rechargeable hedge trimmer (hedge clippers) that trims the branches and leaves of hedges. Power tool N is a rechargeable grass shear (lawn clipper) that trims and edges grass (a lawn). The fourth class 32 of power tools comprises four types of power tools P-S, to each of which two of the battery packs 34 having the same rated voltage of 18V can be attached as the power supply. Power tool P is a rechargeable chain saw that cuts wood and the like. Power tool Q is a rechargeable hedge trimmer (hedge clippers) that trims and edges the branches and leaves of hedges. The power tool R is a rechargeable brush cutter that trims and edges grass (a lawn). Power tool S is a rechargeable blower that blows air to move (gather up) fallen leaves, yard debris and the like.

The third embodiment shown in FIG. 7 and the fourth embodiment shown in FIG. 8 demonstrate that a power tool set can be configured by establishing various models of power tools for the power tools (the first and third classes 21, 31 of power tools) designed to operate at 18V and to which one 18V battery can be attached and for the power tools (the second and fourth classes 22, 32 of power tools) designed to operate at 36V and to which two 18V batteries can be attached, and housing a combination of the power tools appropriately selected therefrom in the one tool case 23. Selling power tool sets that provide a combination of power tools in accordance with the demands of the users makes it possible to increase the convenience of the users as well as to increase work efficiency. It is also possible to create additional combinations of power tools by selecting a plurality of power tools from only one class of power tools.

By ensuring that each storage space of the tool case 23 according to the fourth embodiment has sufficient depth, each power tool of the third or fourth class 31, 32 of power tools is stored in its storage space with an orientation such that the battery pack 34 abuts the bottom part and is vertically upright. Consequently, each power tool can be stored with a stable orientation wherein its center of gravity is positioned on the bottom-part side as much as possible. For example, power tools L, M, N of the third class 31 of power tools and power tools S, P, Q of the fourth class 32 of power tools are each stored with a longitudinally oriented attitude wherein each is stood up from the transversely oriented attitude, which extends transversely in the drawing, and extends vertically. Therefore, each power tool can be stored in a storage space with a stable orientation wherein each power tool's battery pack 34 is positioned on the bottom-part side. Furthermore, in this embodiment, it is preferable from the viewpoint of saving space to separate the tip cutting tools of power tools M, Q (the hedge trimmers) and the tip nozzle of the power tool S (the blower) from their tool main body parts and store them in the storage spaces. In addition, it is preferable to separate the tip cutting tool, an extension bar, the handle part, and the tool main body part from power tool R (the mower) of the fourth class 32 of power tools, store the tool main body part in the state wherein the battery packs 34 abut the bottom part of the storage space, and store the tip cutting tool and the like in the storage spaces.

The combination of the power tools selected from the first through fourth classes 21, 22, 31, 32 of power tools can be predetermined or pre-selected (prepatterned) at a store, which may be e.g., a retail store, a wholesaler, on-line store, etc. (collectively referred to as "sales company" hereinafter) that sells the power tool set(s) or at a power tool manufacturer (e.g., a head office). By establishing predetermined power tool sets (kits) with particular combinations of power tools and storing such in a database in a terminal PC (or other computing device) of the sales company or a host PC (or other computing device) of the power tool manufacturer head office (or another location designated and/or controlled by the power tool manufacturer), sales of the power tool sets can be expanded.

Figure 9:
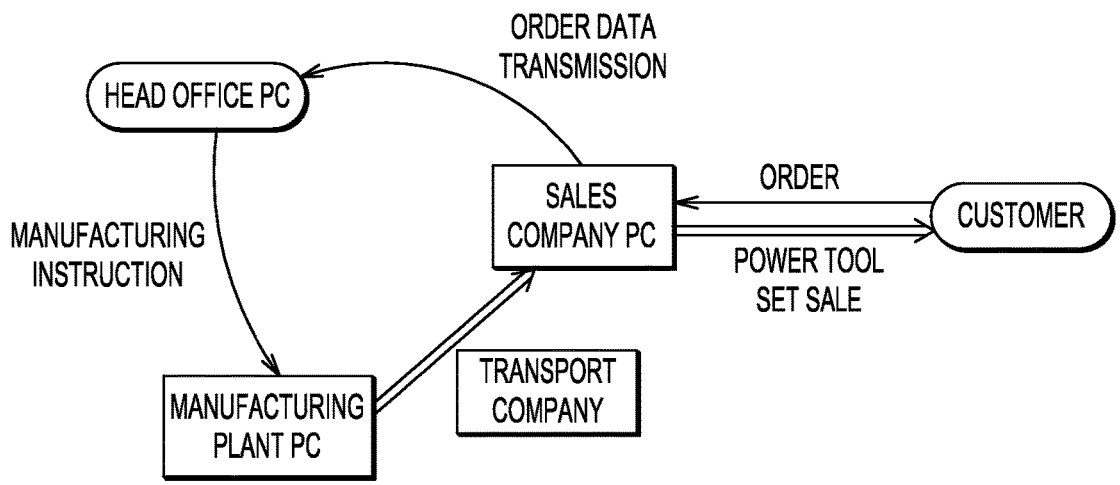
FIG. 9 is a conceptual diagram that shows an overview (a first sales system) of the travel path of power tool sets related to customer orders and of the transmission and receipt of order data, etc.

FIGS. 9-12 show sales systems that are overviews of the transmission and receipt of sales data from order acceptance to delivery of power tool sets and of travel paths of products. Furthermore, in the drawings, personal computers serving as terminals or host computers are each indicated simply as "PC." It is understood that the term "PC" is not limiting, and encompasses any type of suitable computing device, such as portable terminals, tablets, smartphones, servers, cloud-based computing solutions, etc. FIG. 9 exemplifies a first sales system. In the first sales system, the transmission and receipt of sales (order) data is carried out among the head office of the power tool manufacturer, the sales company (the store), and a manufacturing plant. At the sales company, order details received from the customer are input into the terminal PC. At the head office of the power tool manufacturer, the predetermined power tool sets with the particular combinations of the power tools designed to operate at 18V and to which one 18V battery is attached and of the power tools designed to operate at 36V and to which two 18V batteries are attached are entered into the database. The customer can place an order by selecting the desired power tool set from among the predetermined power tool sets.

The order data that was input at the sales company is transmitted to the host PC of the head office. At the head office, the order data of numerous customers is batch managed by the host PC. At the head office, a power tool set manufacture instruction is transmitted to the manufacturing plant based on the batch managed customer order data. At the manufacturing plant, the terminal PC verifies the manufacture instruction. At the manufacturing plant, the power tool sets are manufactured based on the manufacture instruction verified by the terminal PC. The manufactured power tool sets are shipped from the manufacturing plant. At the manufacturing plant, data related to the fact that the power tool sets have been shipped according to the customer orders are input into the terminal PC. The inputted shipping information is transmitted to the head office PC, where it is batch managed.

The manufactured power tool sets are transported from the manufacturing plant to the sales company by a transport service provider or company (e.g., a parcel-delivery service provider). At the sales company, the fact that the power tool sets have been received according to the customer orders is entered into the terminal PC. The inputted data are transmitted to the head office PC where the data are batch managed. In addition, the customers are also respectively contacted to inform them that the power tool sets have arrived. The sales company waits for the customers to come in to pick up their orders and then hands over the power tool sets as the products, and thereby the series of sales activities is complete. Furthermore, in accordance with the wishes of each customer, the sales company may deliver the received power tool set directly to the customer's door.

In the above first sales system, information about power tool sets according to customer orders is shared among the terminal PC of the sales company, the host PC of the head office, and the terminal PC at the manufacturing plant, or through a network to which the terminal PC of the transport company has been added.

Figure 10:
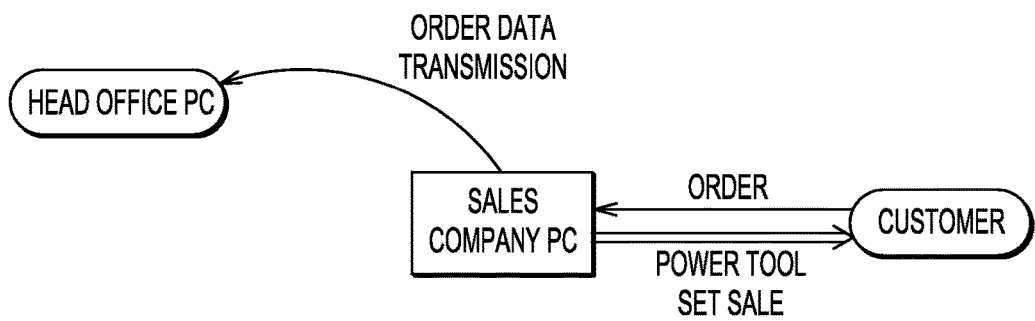
FIG. 10 is a conceptual diagram that shows an overview (a second sales system) of the travel path of power tool sets related to customer orders and of the transmission and receipt of order data, etc.

FIG. 10 exemplifies a second sales system, which primarily concerns the inventory of power tool sets available at the sales company. As in the first sales system, a customer can place an order by selecting a desired power tool set from among the predetermined power tool sets. At the sales company, the data of the order details received from the customer are input into the terminal PC. The inputted data are transmitted to the host PC of the head office where the data are batch managed. At the sales company, at the point in time when the customer's order details are input into the terminal PC or based on an instruction from the head office, it is determined whether the sales company has the power tool set according to the customer's order available in its inventory. If so, the power tool set from the inventory can be immediately sold (delivered) to the customer on the spot at which the order was received or can be shipped to the customer for home delivery. That is, the customer's order can be filled by using a power tool set, or a combination of power tools, that is/are present (currently available) in the sales company's inventory and, if necessary, the sales company can place the desired tools into a tool case or other container for delivery and/or shipping.

Figure 11:
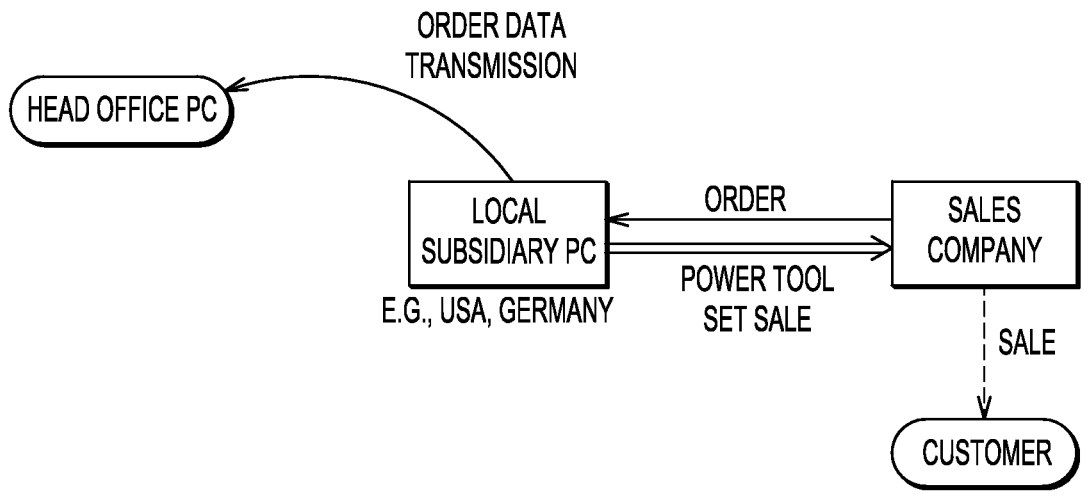
FIG. 11 is a conceptual diagram of an overview (a third sales system) of the travel path of power tool sets related to customer orders and of the transmission and receipt of order data, etc.

FIG. 11 exemplifies a third sales system, in which it is assumed that an inventory of the power tool set is available at a local subsidiary (e.g., a retail store). Furthermore, the local subsidiary is, for example, a local subsidiary company in a country such as the United States, Germany, or the like. As in the second sales system, a customer can place an order with the sales company by selecting a desired power tool set from among the predetermined power tool sets. At this time, the customer places an order with the local subsidiary via the sales company. At the local subsidiary, the data of the order details received from the sales company (the customer) are input into the terminal PC. The inputted data are transmitted to the host PC of the local subsidiary, where the data are batch managed. At the local subsidiary, at the point in time when the order details of the sales company (the customer) is input into the terminal PC or based on an instruction from the head office, it is determined that the local subsidiary has an inventory of the power tool set according to the order of the sales company (the customer). At the local subsidiary that confirmed the presence of the inventory, a power tool set from the inventory can be immediately sold (delivered) to the customer, via the sales company, on the spot at which the order was received, or can be shipped to the customer for home delivery.

Figure 12:
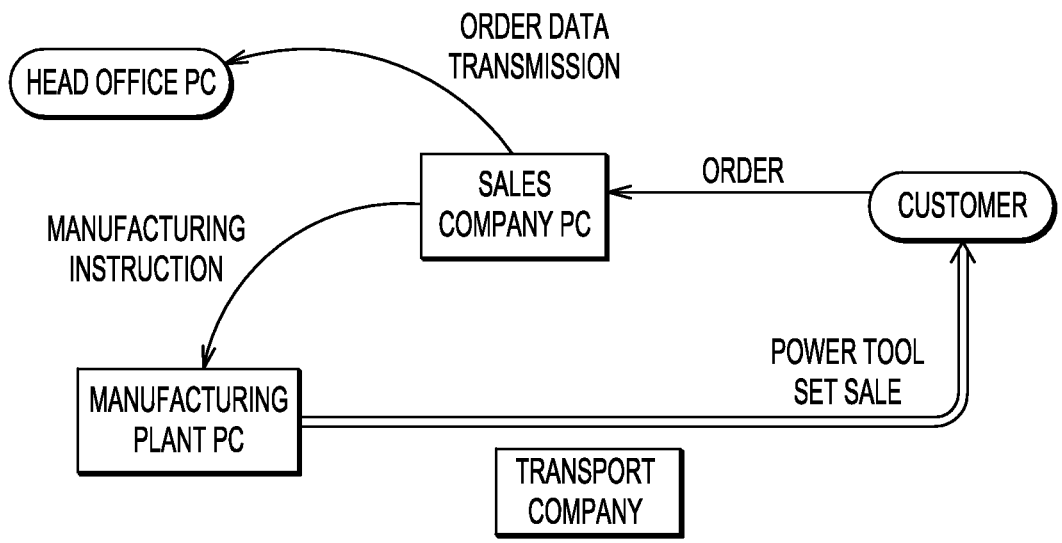
FIG. 12 is a conceptual diagram that shows an overview (a fourth sales system) of the travel path of power tool sets related to customer orders and of the transmission and receipt of order data, etc.

FIG. 12 exemplifies a fourth sales system, in which it is assumed that a manufacturing instruction has been issued directly from the sales company to the manufacturing plant and the manufactured power tool is delivered directly to the customer without transiting the sales company. As in the first and second sales systems, the customer can place an order by selecting a desired power tool set from among the predetermined power tool sets. At the sales company, the data of the order details received from the customer are input into the terminal PC. The inputted data is transmitted to both the host PC of the head office and the terminal PC of the manufacturing plant. At the head office, customers' order details are batch managed. At the manufacturing plant, the power tools of the power tool sets are manufactured according to the customers' orders based on the order details verified by the terminal PC.

The manufactured power tool sets are shipped from the manufacturing plant and transported directly ("home delivered" or delivered to the customer's place of business) to the customers by the transport company. At the manufacturing plant, the fact that the power tool sets have been shipped according to the customer orders is input via the terminal PC. The inputted shipping data is transmitted to both the host PC of the head office and the terminal PC of the sales company and is managed by each PC. In addition, at the transport company, the fact that the power tool sets have been delivered directly to the customers according to the customer orders is transmitted to the host PC of the head office, the terminal PC of the sales company, and the terminal PC of the manufacturing plant, and thereby the fact that the series of sales activities has been completed is verified.

Various modifications can be made to each of the embodiments that were described above. For example, the first and second embodiments exemplified a configuration wherein two power tools (the first power tools 3, 12 and the second power tools 4, 13) are housed in the tool cases 2, 11 and sold as a set (kit), but a configuration may be utilized wherein three or more power tools are combined and sold as a set (kit). In addition, the chargers 5, 14 and/or the battery packs 6, 15 may be omitted from the power tool sets 1, 10. In such embodiments, spaces for housing the chargers 5, 14 and spaces for housing the spare battery packs 6, 15 can be omitted in the tool cases 2, 11.

A configuration may be utilized wherein one or both of the power tool sets 1, 10 comprises a dual-port charger (a charger having two charging cradles, to which two battery packs can be respectively attached and charged simultaneously) instead of the exemplified one-port chargers 5, 14.

Furthermore, the third and fourth embodiments exemplify the tool case 23 that is partitioned into the four storage spaces but are also applicable to tool cases partitioned into two or more storage spaces. In addition, instead of the configuration wherein the tool case is partitioned into such storage spaces, a configuration may be utilized wherein the partition walls 2c, 11 c in the first and second embodiments are provided where appropriate and hold the stored power tools.

Furthermore, instead of the plastic hard case, each of the tool cases 2, 11, 23 may be a tool bag made of cloth or leather, or a backpack that is carried on one's back. In addition, a simple cardboard box (shipping container) may be used as the tool case. Even in such embodiments, the effect of enhancing the added-value, the effect of reducing costs, and the like are obtained.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved power tool sets (kits) and/or sales systems.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Although some aspects of the present invention have been described in the context of a device or sales system, it is to be understood that these aspects also represent a description of a corresponding method, so that a block or a component of a device or sales system is also understood as a corresponding method step or as a feature of a method step. In an analogous manner, aspects which have been described in the context of or as a method step also represent a description of a corresponding block or detail or feature of a corresponding device.

Depending on certain implementation requirements, exemplary embodiments of the invention, such as the computers (terminal PC, host PC, etc.) may be implemented in hardware and/or in software. The implementation can be performed using a digital storage medium, for example a floppy disk, a DVD, a Blu-Ray disc, a CD, a ROM, a PROM, an EPROM, an EEPROM or a flash memory, a hard drive or another magnetic or optical storage device, on which electronically readable control signals are stored, which interact or can interact with a programmable hardware component such that the respective method is performed.

A programmable hardware component can be formed by a processor, a computer processor (CPU=central processing unit), a graphics processor (GPU=graphics processing unit), a computer, a computer system, an application-specific integrated circuit (ASIC), an integrated circuit (IC), a system-on-a-chip (SOC), a programmable logic element, or a field programmable gate array (FGPA) including a microprocessor.

The digital storage medium can therefore be machine- or computer readable. Some exemplary embodiments thus comprise a data carrier or non-transient computer readable medium which includes electronically readable control signals which are capable of interacting with a programmable computer system or a programmable hardware component such that one of the methods described herein is performed. An exemplary embodiment is thus a data carrier (or a digital storage medium or a non-transient computer-readable medium) on which the program for performing one of the methods described herein is recorded.

In general, exemplary embodiments of the present invention are implemented as a program, firmware, computer program, or computer program product including a program, or as data, wherein the program code or the data is operative to perform one of the methods if the program runs on a processor or a programmable hardware component. The program code or the data can for example also be stored on a machine-readable carrier or data carrier. The program code or the data can be, among other things, source code, machine code, bytecode or another intermediate code.

A further exemplary embodiment is a data stream, a signal sequence, or a sequence of signals which represents the program for performing one of the methods described herein. The data stream, the signal sequence, or the sequence of signals can for example be configured to be transferred via a data communications connection, for example via the Internet or another network. Exemplary embodiments are thus also signal sequences which represent data, which are intended for transmission via a network or a data communications connection, wherein the data represent the program.

A program according to an exemplary embodiment can implement one of the methods during its performance, for example, such that the program reads storage locations or writes one or more data elements into these storage locations, wherein switching operations or other operations are induced in transistor structures, in amplifier structures, or in other electrical, optical, magnetic components, or components based on another functional principle. Correspondingly, data, values, sensor values, or other program information can be captured, determined, or measured by reading a storage location. By reading one or more storage locations, a program can therefore capture, determine or measure sizes, values, variable, and other information, as well as cause, induce, or perform an action by writing in one or more storage locations, as well as control other apparatuses, machines, and components, and thus for example also perform complex processes using actuators.

Additional embodiments of the present teachings include, but are not limited to:

A sales system of a power tool set, wherein the power tool set is moved and data are transmitted and received among: a sales company, which accepts an order of a customer and inputs data into a PC; a head office, which uses a PC to batch manage customer order data inputted by the sales company; a manufacturing plant, which, based on an instruction of the head office, manufactures power tools of a plurality of types with respect to the number of battery packs attached, and combines these to configure a power tool set for selling as a set; and a transport company, which transports the power tool set from the manufacturing plant to the sales company.

A sales system of power tools, wherein, at a sales company, in accordance with an order of a customer, the power tools of a plurality of types with respect to the number of battery packs attached are combined from inventory and sold as a set; and sales data are batch managed at a head office.

A sales system, wherein, at a sales company, accepted customer order data is transmitted to a manufacturing plant; power tools of a plurality of types with respect to the number of battery packs attached are manufactured at the manufacturing plant based on the order data; and a power tool set that combines the multiple types of the power tools is shipped by parcel delivery from the manufacturing plant to the customer.

A sales system wherein a first power tool comprising one battery-mount part for attaching a battery pack as a power supply and a second power tool that comprises two of the battery-mount parts are combined and sold as a set, wherein combinations of the first power tool and the second power tool are predetermined at the manufacturer or the sales company of the power tools; and a customer places an order for a power tool set by selecting from the predetermined combinations.

A distributed computing network configured to manufacture and sell power tool sets, wherein data are transmitted and received among a network of:
 a computer located at a sales company and configured to receive and process data concerning a customer order;
 a computer located at a head office and configured to batch manage customer order data inputted by the sales company and to generate a manufacturing instruction;
 a computer located at a manufacturing plant and configured to receive the manufacturing instruction from the head office, and based thereon, to manufacture power tools of a plurality of types with respect to the number of battery packs attached, and to combines the manufactured power tools to configure a power tool set in accordance with the customer's order; and a computer located at a transport company and configured to receive a transport instruction for transporting the power tool set from the manufacturing plant to the sales company.

A method, comprising preparing a set of predetermined combinations of first power tools and second power tools at a manufacturer or at a sales company of the power tools, wherein the first power tools have one battery-mount part configured to attach one battery pack as its power supply and the second power tool have two of the battery-mount parts configured to attach two battery packs as its power supply, the predetermined combinations being configured for sale as power tool kits; and accepting a customer order for one of the power tool sets selected from the predetermined combinations.

EXPLANATION OF THE REFERENCE NUMBERS

1 Power tool set (first embodiment)
2 Tool case
2a Case main-body part
2b Cover part (lid)
2c Wall (Partition wall)
2d Hinge part
2e Handle part
2f Lock
3 First power tool (18V rating)
3a Battery-mount part
4 Second power tool (36V rating)
4a Battery-mount part
5 Charger
6 Battery pack (18V rated voltage)
10 Power tool set (second embodiment)
11 Tool case
11a Case main-body part
11b Cover part (lid)
11c Wall (Partition wall)
11d Hinge part
11e Handle part
11f Lock
12 First power tool (18V rating)
12a Battery-mount part
13 Second power tool (36V rating)
13a Battery-mount part
14 Charger
15 Battery pack (18V rated voltage)
20 Power tool set (third embodiment)
21 First class of power tools
22 Second class of power tools
23 Tool case
23a Longitudinal wall
23b Transverse wall
24 Battery pack (18V rated voltage)
30 Power tool set (fourth embodiment)
31 Third class of power tools
32 Fourth class of power tools
34 Battery pack (18V rated voltage)

The invention claimed is:

1. A power tool kit, comprising:
a first power tool having exactly one battery mount and being configured to be powered by exactly one battery;
a second power tool having exactly two battery mounts and being configured to be powered by exactly two batteries;
first, second, third, fourth and fifth interchangeable, rechargeable, batteries, the first battery being slidably attached to the battery mount of the first power tool such that the first battery projects from the first power tool, and the second battery being slidably attached to a first one of the exactly two battery mounts of the second power tool such that the second battery projects from the second power tool and the third battery being slidably attached to a second one of the exactly two battery mounts of the second power tool such that the third battery projects from the second power tool;
a carrying case comprising a base portion and a lid and a handle, the base portion having an interior defined by a bottom and first, second, third and fourth sides projecting from the bottom, the lid being hingedly connected to the base portion and being shiftable between an open position allowing access to the interior and a closed position secured to the base portion and preventing access to the interior,
the base portion including at least one first internal structure at least partially defining a first receiving space configured to hold the first power tool with the exactly one battery attached to the first power tool and configured to hold the first power tool with no battery attached thereto and at least one second internal structure at least partially defining a second receiving space configured to hold the second power tool with the exactly two batteries attached to the second power tool and to hold the second power tool with no batteries attached thereto;
the base portion including at least one third internal structure at least partially defining a third receiving space configured to hold the fourth battery and at least one fourth internal structure at least partially defining a fourth receiving space configured to hold the fifth battery, the fourth battery being mounted in the third receiving space and the fifth battery being mounted in the fourth receiving space.

2. The power tool kit according to claim 1, wherein the first, second, third, fourth and fifth batteries are all 18-volt batteries.

3. The power tool kit according to claim 2, wherein the handle is connected to the first side and wherein the third side is opposite the first side and wherein the at least one first internal structure and the at least one second internal structure are configured such that the first battery pack is located between the first power tool and the first side and such that the second battery pack and the third battery pack are located between the second power tool and the first side.

4. The power tool kit according to claim 2, wherein the handle is connected to the first side and wherein the third side is opposite the first side and wherein the at least one first internal structure and the at least one second internal structure are configured such that the first battery pack is located between the first power tool and the third side and such that the second battery pack and the third battery pack are located between the second power tool and the third side.

5. The power tool kit according to claim 2, wherein the at least one first internal structure comprises a first set of internal walls configured to hold the first power tool and a second set of internal walls configured to hold the first battery when the first battery is attached to the first power tool and wherein at least one second internal structure comprises a third set of internal walls configured to hold the second power tool and a fourth set of internal walls configured to hold the second battery and the third battery when the second and third batteries are attached to the second power tool.

6. The power tool kit according to claim 5, further comprising:
a dual-port charger having two charging cradles configured to simultaneously charge two battery packs,
wherein the base portion includes at least one fifth internal structure at least partially defining a fifth receiving space configured to hold the dual-port charger, and
wherein the dual-port charger is mounted in the fifth receiving space.

7. A power tool kit, comprising:
a first power tool having exactly one battery mount and being configured to be powered by exactly one 18 volt battery;
a second power tool having exactly two battery mounts and being configured to be powered by exactly two 18 volt batteries;
a first 18 volt battery and a second 18 volt battery, the first and second batteries being interchangeable and rechargeable, the first 18 volt battery being slidably attachable to the battery mount of the first power tool such that the first battery projects from the first power tool, or to one of the exactly two battery mounts of the second power tool such that the first battery projects from the second power tool, a carrying case comprising a base portion and a lid and a handle, the base portion having an interior defined by a bottom and first, second, third and fourth sides projecting from the bottom, the lid being hingedly connected to the base portion and being shiftable between an open position allowing access to the interior and a closed position secured to the base portion and preventing access to the interior,
the base portion including at least one first internal structure at least partially defining a first receiving space configured to hold the first power tool with the exactly one 18 volt battery attached to the first power tool and configured to hold the first power tool with no battery attached thereto and at least one second internal structure at least partially defining a second receiving space configured to hold the second power tool with the exactly two 18 volt batteries attached to the second power tool and to hold the second power tool with no batteries attached thereto;
the base portion including at least one third internal structure at least partially defining a third receiving space configured to hold the first battery and at least one fourth internal structure at least partially defining a fourth receiving space configured to hold the second battery, the first battery being mounted in the third receiving space and the second battery being mounted in the fourth receiving space.

* * * * *